United States Patent
Lim et al.

[11] Patent Number: 5,933,649
[45] Date of Patent: Aug. 3, 1999

[54] METHOD AND DEVICE FOR CONTROLLING A CPU STOP CLOCK INTERRUPT

[75] Inventors: Jung-Gyu Lim; Hee-Duck Park; Shung-Hyun Cho, all of Suwon; Noh-Buyng Park, Seoul, all of Rep. of Korea

[73] Assignee: Samsung Electronics Co., Ltd., Kyungki-do, Rep. of Korea

[21] Appl. No.: 08/599,264

[22] Filed: Feb. 9, 1996

Related U.S. Application Data

[63] Continuation-in-part of application No. 08/492,492, Jun. 20, 1995, Pat. No. 5,754,883.

[30] Foreign Application Priority Data

Jun. 20, 1994 [KR] Rep. of Korea ................ 94-13919

[51] Int. Cl.[6] ............................................. G06F 1/30
[52] U.S. Cl. ................................ 395/750.04; 713/601
[58] Field of Search ............................. 395/560, 750, 395/750.04, 750.08; 364/707

[56] References Cited

U.S. PATENT DOCUMENTS

| | | | |
|---|---|---|---|
| 4,780,843 | 10/1988 | Tietjen | 395/750 |
| 5,189,647 | 2/1993 | Suzuki et al. | 368/10 |
| 5,201,059 | 4/1993 | Nguyen | 395/750 X |
| 5,239,652 | 8/1993 | Seibert et al. | 395/750 |
| 5,355,501 | 10/1994 | Gross et al. | 395/750 |
| 5,361,392 | 11/1994 | Fourcroy et al. | 395/560 X |
| 5,371,693 | 12/1994 | Nakazoe | 364/707 |
| 5,442,794 | 8/1995 | Wisor et al. | 395/750.08 |
| 5,546,568 | 8/1996 | Bland et al. | 395/560 X |

*Primary Examiner*—Thomas M. Heckler
*Attorney, Agent, or Firm*—Cushman Darby & Cushman; IP Group of Pillsbury Madison & Sutro LLP

[57] ABSTRACT

A method and device for controlling a CPU stop clock interrupt of a computer system. The device includes an idle detector and a control processor. A CPU having a stop clock interrupt mode receives a stop clock interrupt signal and sets up and clears the stop clock interrupt mode according to a logic state of the stop clock interrupt signal. The control processor receives a signal representing an idle condition of the computer system from the idle detector, a signal for enabling idle detector control of the CPU stop clock interrupt mode and a signal for forcing the CPU to resume a normal mode by clearing the stop clock interrupt mode. The idle condition can be defined by a computer user according to a selection of predetermined times during which no user inputs are received by the computer system. The method includes monitoring the idle condition of the computer system, monitoring the signal for enabling idle detector control of the stop clock interrupt mode and monitoring the signal for forcing the CPU to resume a normal mode by clearing the stop clock interrupt mode. The stop clock interrupt signal is output having a logic state corresponding to the logic combination of the monitored signals.

22 Claims, 2 Drawing Sheets

METHOD AND DEVICE FOR CONTROLLING A CPU STOP CLOCK INTERRUPT

This is a continuation-in-part application of application Ser. No. 08/492,492 filed Jun. 20, 1995 and entitled "SYSTEM FOR CONTROLLING STOP CLOCK INTERUPT MODE ACCORDING TO USER SELECTABLE IDLE CONDITION PARAMETERS AND A CONTROL SIGNAL", now U.S. Pat. No. 5,754,883.

BACKGROUND OF THE INVENTION (1) Field of the Invention

The present invention relates to a method and device for controlling a CPU stop clock interrupt. More particularly, the present invention controls a stop clock interrupt of a Static Low-Power Central Processing Unit (hereinafter referred to as SL CPU), such as that manufactured by Intel Corporation, with the use of an idle detector and a control processor.

(2) Description of the Related Art

Computer systems with power-saving functions are well known. Such computer systems enable users to switch the computer from a normal operating mode to a power-off mode, which reduces power consumption if there is no user input for a predetermined period of time, and to switch it back into a resume-mode if there is any input requiring the system to resume normal operations.

An SL CPU such as that manufactured by Intel provides modes, which if selected, can greatly reduce power consumption. Accordingly, it is ideally suited for use in computer systems having power-saving functions.

For example, an SL CPU provides a stop clock interrupt terminal for allowing external control of system clock speed. Conventionally, a system controller chipset, such as that which is further illustrated in the following description, is employed to externally control the clock speed of the SL CPU through the stop clock interrupt terminal.

A conventional stop clock interrupt controller will be described with reference to the FIG. 1 block diagram of a conventional stop clock interrupt controller.

As shown in FIG. 1, the conventional stop clock interrupt controller comprises a system controller chipset 5 (shown as SCC in the drawing), which is very expensive, and SL CPU 4, of which a stop clock interrupt terminal STPCLK is connected with an output terminal of the system controller chipset 5. Operation of the conventional stop clock interrupt controller is described below.

To reduce power consumption during specific operating modes, the system controller chipset 5 is especially designed to generate a stop clock interrupt signal to control the clock speed of the SL CPU 4. When the system controller chipset 5 outputs the stop clock interrupt signal to the SL CPU 4, the SL CPU 4 conserves power by lowering its clock speed.

However, as described above, the conventional stop clock interrupt controller requires a very expensive system controller chipset 5. Therefore, the cost of producing a computer system including a conventional power-saving feature is increased by the cost of conventionally providing that feature.

Furthermore, because the conventional stop clock controller generates a stop clock interrupt only in the specific modes for which it is designed to do so, a user can not voluntarily control the clock speed of the SL CPU 4 for any other purpose through the stop clock interrupt terminal STPCLK of SL CPU 4. Likewise, once an interrupt is generated, a slow clock mode is entered, but resuming a normal mode of the SL CPU 4 can only be implemented in a restricted number of ways since a conventional stop clock interrupt controller is also required to clear the clock interrupt mode.

SUMMARY OF THE INVENTION

Accordingly, it is an object of the present invention to provide a method and device for controlling a CPU stop clock interrupt which solves the problems in the prior art. The stop clock interrupt controller according to one embodiment of this invention is less expensive than the conventional controller which includes the specially manufactured system controller chipset to control a stop clock interrupt.

Another object of the present invention is to provide a method and device for controlling a stop clock interrupt which enables a user to voluntarily control the clock speed of the CPU, through the stop clock interrupt terminal of an SL CPU provided for that purpose.

Another object of the present invention is to provide a method and device for controlling a stop clock interrupt which can force the SL CPU to resume a normal operating mode when it is in the stop clock interrupt mode.

In order to achieve these objects, the present invention provides a device which includes an idle detector and a control processor. An SL CPU having a stop clock interrupt mode receives a stop clock interrupt signal and sets up and clears the stop clock interrupt mode according to a logic state of the stop clock interrupt signal. The control processor receives a signal representing an idle condition of the computer system from the idle detector, a signal for enabling the idle detector control of the stop clock interrupt mode and a signal for forcing the SL CPU to resume the normal mode by clearing the stop clock interrupt mode. The idle condition can be defined by a computer user according to a selection of predetermined times during which no user inputs are received by the computer system.

The method according to the present invention includes monitoring the idle condition of the computer system, monitoring the signal for enabling idle detector control of the stop clock interrupt mode and monitoring the signal for compulsorily waking up the SL CPU by clearing the stop clock interrupt mode. The stop clock interrupt signal is output having a logic state corresponding to the logic combination of the monitored signals.

DETAILED DESCRIPTION OF THE PREFERRED EMBODIMENTS

A preferred embodiment of the present invention will become apparent from a study of the following detailed description, when viewed in light of the accompanying drawings.

Figure 1:
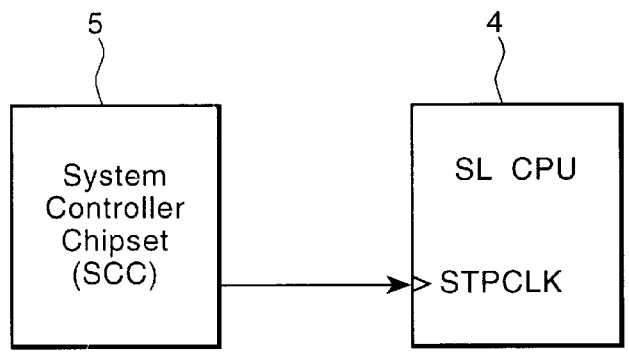
FIG. 1 is a block diagram of a conventional stop clock interrupt controller.
Figure 2:
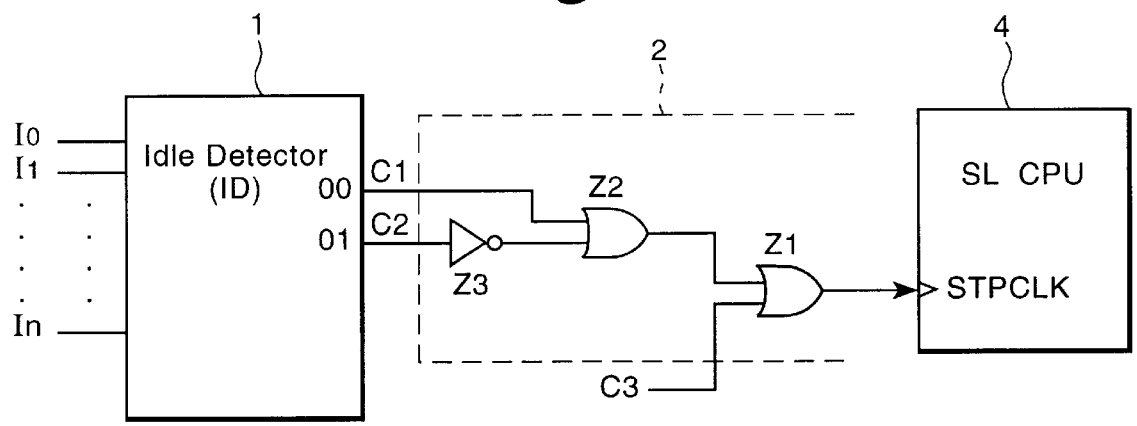
FIG. 2 is a block diagram of a stop clock interrupt controller provided in accordance with a preferred embodiment of the present invention.

As shown in FIG. 2, according to a preferred embodiment of the present invention, the stop clock controller includes an idle detector 1, a control processor 2, and an SL CPU 4 which is, for instance, a microprocessor manufactured by Intel Corporation.

The idle detector 1, when the SL CPU 4 converts into its specific power-saving mode, uses signals $I_0$–$I_n$ as input signals for deciding whether an operating condition of the computer system requires the CPU to switch out of the mode. The idle detector 1 outputs C1 and C2 through a main output channel 00 and an alternative output channel 01, respectively.

The control processor 2 includes an inverter Z3, which receives the second control signal C2 from the alternative channel 01 of the idle detector as an input; a first OR gate Z2, which receives an output signal from the inverter Z3 as one input, and which receives the first control signal C1, indicating an idle condition according to the detection of input signals $I_0$–$I_n$, from the main output channel 00 of the idle detector as the other input; and a second OR gate Z1, which receives an output signal from the OR gate Z2 as one input, and which receives the third control signal C3, outputted from a system that is controlled voluntarily by the user, as the other input.

The SL CPU 4 converts to the stop clock interrupt mode when the stop clock interrupt signal having a logic low level from the control processor 2 is inputted to the stop clock terminal STPCLK.

Figure 3:
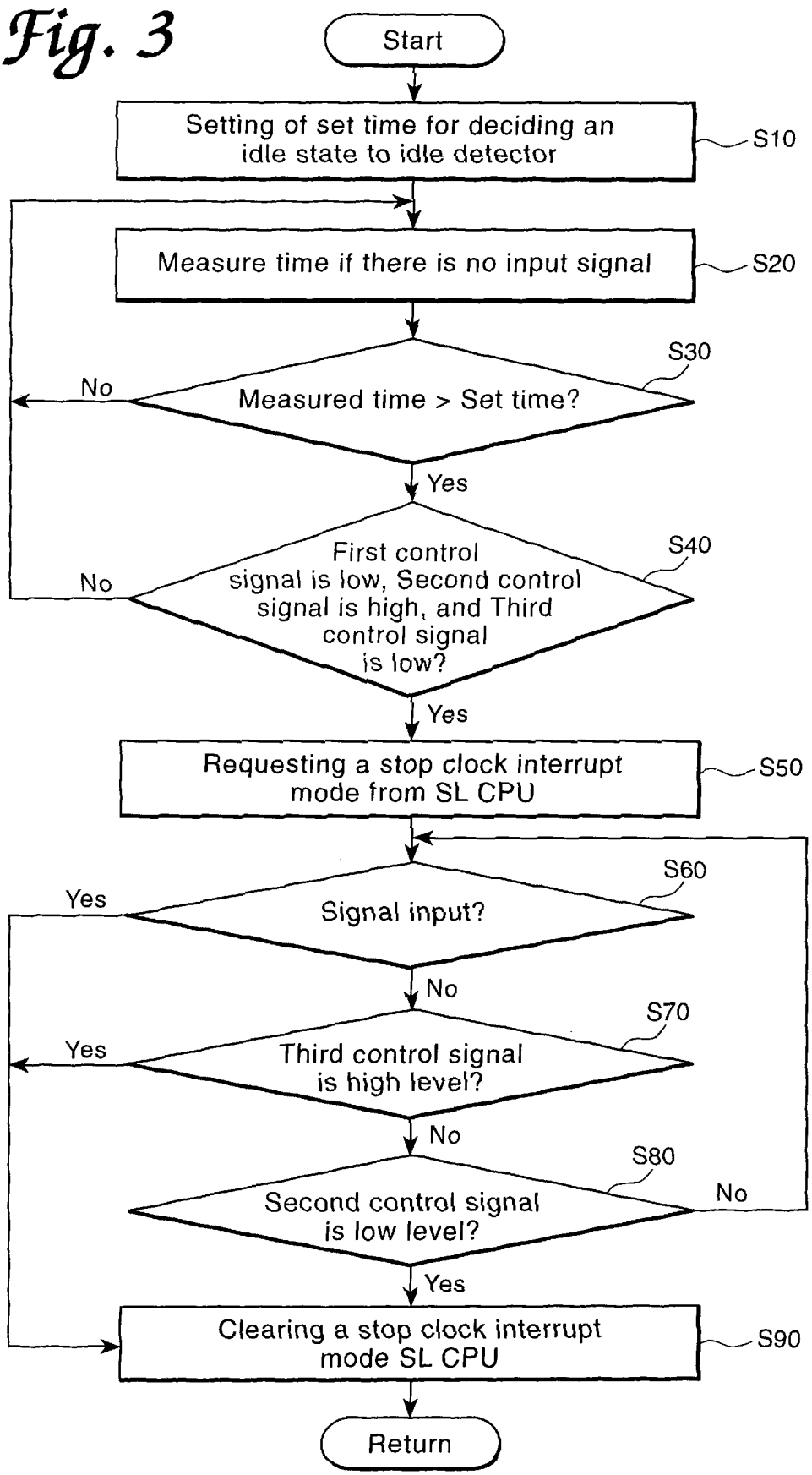
FIG. 3 is an operation flowchart of a method for controlling a stop clock interrupt in accordance with a preferred embodiment of the present invention.

FIG. 3 is an operation flowchart of a method for controlling a stop clock interrupt in accordance with a preferred embodiment of the present invention.

As shown in FIG. 3, a method for controlling a stop clock includes procedures both for requesting a stop clock interrupt mode of the SL CPU and for clearing a stop clock interrupt mode.

The method for requesting a stop clock interrupt mode according to the preferred embodiment is as follows.

In a first sub-step S10, a user directly sets up idle time periods with binary codes indicating the idle detection time used by the idle detector 1. For example, the binary codes can designate system idle time intervals for requesting the stop clock in increments of 5 minutes from an idle time range of 5 minutes to 75 minutes.

In a second sub-step S20, the idle detector monitors the presence of input signals $I_0$–$I_n$ into the computer system, and measures the idle times during which no user inputs are received.

In a third sub-step S30, the measured idle times are compared with the set times selected by the user for deciding whether to invoke the idle state of system. If the idle time exceeds the set times, processing advances to the next step S40. Otherwise, processing returns to the second step S20 for sensing the input signals $I_0$–$I_n$ of the idle detector 1 if the measured idle times are insufficient for deciding to invoke the idle state of the system.

In a fourth sub-step S40, it is determined if the first control signal is low, the second control signal is high, and the third control signal is low. If this condition is not satisfied, processing returns to step S20; otherwise, processing advances to the next step.

In a fifth sub-step S50, the stop clock interrupt signal is inputted to stop clock interrupt terminal STPCLK of the SL CPU if the first control signal is low, the second control signal is high, and the third control signal is low as determined in the fourth sub-step S40. Accordingly, the stop clock interrupt from SL CPU 4 is requested, and the system mode is converted to the stop clock-interrupt mode through the feature of the SL CPU 4.

The method for clearing a stop clock interrupt mode according to the preferred embodiment is as follows.

In the step S60, while the SL CPU maintains the stop clock interrupt mode, if input signals $I_0$–$I_n$ are sensed by the operation of the idle detector, processing shifts to step S90, which clears the stop clock interrupt mode, because the first control signal is high when there exists input signals $I_0$–$I_n$. Otherwise, processing advances to next step S70.

In the step S70, while the SL CPU maintains the stop clock interrupt mode, if the third control signal C3 has the low level signal, processing advances to step S80. Otherwise, processing shifts to the step S90, which clears the stop clock interrupt mode, if the third control signal C3 has a high level signal.

In the step S80, the second control signal of the alternative output channel 01 from the idle detector 1 is sensed. Processing advances to the next step S90, which clears the stop clock interrupt mode, if the output signal from alternative output channel 01 is at a low level. Otherwise, processing returns to step S60.

As described before, in the step S90 of the method for controlling the stop clock, after any of the above-described steps to clear the stop clock interrupt mode are sensed, the SL CPU 4 operates normally by clearing the stop clock interrupt mode of the SL CPU 4.

The operation of the method and device for controlling a stop clock interrupt according to a preferred embodiment of the present invention is described more fully below.

During the set times for deciding the idle state of the system, if there are no input signals $I_0I_n$, the idle detector 1 automatically generates output signals for detecting an idle state through two channels 00, 01, respectively. Under this condition, for example, the main output channel 00 outputs a low level signal as a first control signal. The alternative output channel outputs a high level signal as a second control signal.

As shown in Table 1 below, the user can set up the set times for deciding an idle state, with a binary numeral having four digits, by using four jumpers (not shown in drawings) per channel, respectively.

TABLE 1

| Jumper (binary) | Time (mins.) | Jumper (binary) | Time (mins.) |
|---|---|---|---|
| 0 0 0 0 | Infinity | 1 0 0 0 | 40 |
| 0 0 0 1 | 5 | 1 0 0 1 | 45 |
| 0 0 1 0 | 10 | 1 0 1 0 | 50 |
| 0 0 1 1 | 15 | 1 0 1 1 | 55 |
| 0 1 0 0 | 20 | 1 1 0 0 | 60 |
| 0 1 0 1 | 25 | 1 1 0 1 | 65 |
| 0 1 1 0 | 30 | 1 1 1 0 | 70 |
| 0 1 1 1 | 35 | 1 1 1 1 | 75 |

The input signals $I_0$–$I_n$ of the idle detector 1 are used to determine whether the SL CPU should switch from a normal operating mode into a stop clock interrupt mode to reduce power consumption. The input signals represent user inputs via Input/Output devices such as a keyboard or mouse.

Although the SL CPU 4 is activated according to the receipt of one signal among the input signals $I_0$–$I_n$, the user can voluntarily select the same or another signal applied to the system among the input signals $I_0$–$I_n$.

By way of illustration, if the user sets up four jumpers to select a binary numeral 0111, the idle detector 1 decides an idle state of the system when there are no input signals $I_0$–$I_n$ in the system for 35 minutes, and outputs an output signal from the above step through the two channels 00 and 01, respectively.

The two channels 00 and 01 have high level signals when the idle detector 1 does not generate the output signal. If the idle detector 1 decides an idle state of the system, while the main output channel 00 is set to a low level signal, the alternative output channel 01 maintains a high level signal mainly according to voluntary control by a user.

The control processor 2 enables such user control operation of the SL CPU 4 by the passing output of the alternative output channel 01 through the inverter Z3, and making a low level signal of a signal pass through the first OR gate Z2 of which one side terminal is connected with an output terminal of the inverter Z3 and of which the other side terminal is connected with an output terminal of the main output channel 00.

Consequently, the low level signal is inputted to one side terminal of the second OR gate Z1, and because the third control signal C3 has a low level signal when it is not voluntarily input by the computer system, a signal having a low level is input to the stop clock interrupt terminal STPCLK of the SL CPU 4, and the stop clock interrupt mode is requested from the SL CPU 4.

As described above, in case the user wants to reduce power consumption by converting the SL CPU 4 into its special mode, the SL CPU 4 sets up the stop clock interrupt mode, senses the input signals $I_0$–$I_n$ of the idle detector 1, and thus is controlled by the idle detector 1 when there are no input signals $I_0$–$I_n$.

When the SL CPU 4 is a stop clock interrupt mode, the way to clear the mode is to reverse logically a stop clock-interrupt signal for requesting the stop clock interrupt mode when deciding an idle state of the system of the idle detector 1.

If the input signals $I_0$–$I_n$ are inputted to the idle detector 1 while the CPU is maintaining the stop clock interrupt mode, the idle detector 1 outputs a high level signal to the main output channel 00 because the system state is not idle. Consequently, the first OR gate Z2 of the processing means 2 outputs a high level signal which is inputted to one side terminal of the second OR gate. The signal through the second OR gate Z1 is inputted to the stop clock interrupt terminal STPCLK of the SL CPU 4. As a result, the SL CPU 4 clears the stop clock interrupt mode.

When the SL CPU 4 is in a stop clock interrupt mode, another way to clear the mode is to use the alternative output channel 01 of the idle detector. The alternative output channel 01 has a high level signal when there is no output signal from the idle detector 1, and outputs a low level signal in case the channel 01 can clear the stop clock interrupt mode by using the main output channel 00. For example, although the computer system is in the stop clock interrupt mode, it is sometimes necessary to enter into another power saving mode. In this case, the CPU of the computer system must return to a normal state from the stop clock interrupt mode, and switch into another power-saving mode. Accordingly, the system operates a timer of the idle detector without keyboard input by a user, so that the CPU returns to a normal state by using the alternative output channel 01 of the idle detector.

The control processor 2 reverses the low level signal from the alternative output channel 01, and outputs a high level signal because the signal reversed through the control processor 2 is a high level signal. As a result, the SL CPU 4 clears the stop clock interrupt mode.

When SL CPU 4 is in a stop clock interrupt mode, the last way to clear the mode is to use the third control signal C3 of the control processor 2. In cases where the idle detector 1 can not control the stop clock interrupt mode, the third control signal C3 outputs a high level signal when the user controls the signal C3 to be a high level signal. As a result, the SL CPU 4 clears the stop clock interrupt mode, and returns to a normal operating mode. For example, if an emergency state such as power failure occurs when the CPU is in the stop clock interrupt mode, the computer system should prepare for the emergency state by sensing the emergency state and returning the CPU to normal state. This can be accomplished by setting the state of signal C3 to the high level.

According to a preferred embodiment of the present invention, by using the idle detector to output a special signal when there is no input signal during a set time for deciding an idle state of the system, and a control processor made of simple logical elements, the stop clock controller simply and inexpensively enables the computer system to convert to the stop clock interrupt mode or to activate the SL CPU while it maintains the stop clock interrupt mode. Consequently, the present invention can provide a method and device for effectively controlling a stop clock interrupt.

While the present invention has been described in detail with reference to the preferred embodiment, those skilled in the art will appreciate that various modifications and substitutions can be made thereto without departing from the spirit and scope of the present invention as set forth in the appended claims.

What is claimed is:

1. A computer system, comprising:
   a central processing unit (CPU) which is controlled by a state of an externally generated stop clock interrupt signal received by said CPU;
   an idle detector which outputs a first control signal according to a duration of an idle condition of said computer system and which outputs a second control signal according to a predetermined time setting, the idle condition being defined by a predetermined period of time at least one input signal is not received by the idle detector; and
   a control processor, which receives the first and second control signals and outputs said stop clock interrupt signal to said CPU according to logic states of the first and second control signals, whereby the computer system enters a first power saving mode when the CPU is deactivated by said stop clock interrupt signal and returns to a normal mode when said CPU is activated by said stop clock interrupt signal;
   wherein said computer system is deactivated to enter a second power saving mode, different than said first power saving mode, after said computer system returns to said normal mode when said CPU is activated by said stop clock interrupt signal.

2. A computer system according to claim 1, wherein:
   said at least one input signal indicates the presence of user inputs received by said computer system.

3. A computer system according to claim 2, wherein:
   a user selects said predetermined period of time for defining said idle condition.

4. The computer system according to claim 1, further comprising:
   an emergency detector, which outputs a third control signal indicating an emergency state of said computer system to said control processor;

wherein said control processor, upon receiving said third control signal, outputs said stop clock interrupt signal to said CPU to activate said computer system to return to said normal mode.

5. The computer system according to claim 4, wherein said emergency detector outputs said third control signal in response to a voluntary use input to clear said power saving mode.

6. A computer system according to claim 1, wherein:
said CPU initiates said first power saving mode in response to a first logic state of said stop clock interrupt signal and terminates said first power saving mode in response to a second logic state of said stop clock interrupt signal.

7. A computer system according to claim 6, further comprising:
means for receiving an alternative idle signal indicative of an alternative idle condition of said computer system, said means for receiving providing said alternative idle signal to said control processor for processing.

8. A computer system according to claim 7, wherein:
said alternative idle condition is an alternative power saving mode.

9. A computer system according to claim 7, wherein:
said control processor outputs said stop clock interrupt signal in said first logic state when said first control signal is in said first logic state, and said alternative idle signal is in said second logic state.

10. A computer system according to claim 7, wherein:
said control processor outputs said stop clock interrupt signal in said second logic state when said first control signal is in said second logic state, or said alternative idle signal is in said first logic state.

11. An apparatus for controlling a computer system, the apparatus comprising:
a central processing unit (CPU) having a normal mode and a first power saving mode;
control signal generating means for outputting a first control signal according to a detected idle condition of said computer system;
emergency detecting means for outputting a second control signal according to a detected emergency condition of said computer system; and
a control processor which receives the outputted first and second control signals, and which causes said CPU to operate in said first power saving mode when the first control signal indicates the idle condition of said computer system for a predetermined time interval and causes the CPU to operate in said normal mode when the second control signal indicates said emergency condition of said computer system.

12. A computer system according to claim 11, wherein said detected emergency condition is a condition of a power failure.

13. A computer system according to claim 11, wherein said idle condition represents the presence of user inputs received by said computer system.

14. A computer system according to claim 13, wherein said detected idle condition is based upon a predetermined period of time during which no user inputs are received by said computer system, said predetermined period of time being selected by a user.

15. The apparatus according to claim 11, wherein the control signal generating means outputs a third control signal according to a predetermined time setting, said third control signal being received by said control processor which causes the CPU to operate in said normal mode when said third control signal is received by said control processor.

16. The apparatus according to claim 15, wherein said CPU is caused by said control processor to operate in a second power saving mode, different that said first power saving mode, after receiving said third control signal and operating in said normal mode.

17. A computer system comprising:
a central processing unit which is controlled by a state of an externally generated stop clock interrupt signal, wherein said central processing unit enters a stop clock interrupt mode and is deactivated when said stop clock interrupt signal is in a first logic state, and said central processing unit stops said stop clock interrupt mode and is activated when said stop clock interrupt signal is in a second logic state;
an idle detector which outputs a first control signal and a second control signal, wherein said first control signal and said second control signal are in predetermined logic states respectively when a user has not provided an input to the computer system for a first predetermined time interval;
a control processor, which
receives said first control signal and said second control signal, outputs said first logic state of said stop clock interrupt signal when said first control signal and said second control signal are in said predetermined logic states, respectively, and controls said central processing unit to enter said stop clock interrupt mode; and
outputs said second logic state of said stop clock interrupt signal when one of said first control signal and said second control signal changes logic state from said predetermined logic states and controls said central processing unit to stop said stop clock interrupt mode.

18. A computer system according to claim 17, wherein:
said first control signal of said idle detector changes state from said predetermined logic state when said central processing unit is in said stop clock interrupt mode when the user provides an input to the computer system, said second control signal of said idle detector changes state from said predetermined logic state when said central processing unit is in said stop clock interrupt mode when said idle detector detects that a second predetermined time interval has elapsed.

19. A computer system, comprising:
a central processing unit which is controlled by a state of an externally generated stop clock interrupt signal, wherein said central processing unit enters a stop clock interrupt mode and is deactivated when said stop clock interrupt signal is in a first logic state, and said central processing unit stops said stop clock interrupt mode and is activated when said stop clock interrupt signal is in a second logic state;
an idle detector which outputs a first control signal and a second control signal, wherein said first control signal and said second control signal are in predetermined logic states, respectively, when a user has not provided an input to the computer system for a first predetermined time interval;
an emergency condition detector for outputting a third control signal having a predetermined logic state according to an emergency condition of said computer;
a control processor, which receives said first control signal, said second control signal and said third control signal, outputs said first logic state of said stop clock interrupt signal when said first control signal, said second control signal and said third control signal are in said predetermined logic states, respectively, and controls said central processing unit to enter said stop clock interrupt mode; and outputs said second logic state of said stop clock interrupt signal when one of said first control signal, said second control signal and said third control signal changes logic state from said predetermined logic states of said first control signal, said second control signal and said third control signal, and controls said central processing unit to stop said stop clock interrupt mode.

20. An apparatus for controlling a computer system comprising:

a central processing unit having a normal mode and a stop clock interrupt mode;

control signal generating means for outputting a first control signal according to a detected idle condition of said computer system;

emergency detecting means for outputting a second control signal according to a detected emergency condition of said computer system; and a control processor, which receives said first and second control signals and causes said central processing unit to operate in said stop clock interrupt mode in response to when said first and second control signal are in respective predetermined logic states; and causes said central processing unit to change from said stop clock interrupt mode to said normal mode when one of said first and second control signal changes logic state from said predetermined logic states.

21. A method for controlling a central processing unit (CPU) of a computer system using a control processor, comprising the steps of:

providing first and second control signals from an idle detector and a third control signal from an emergency condition detector to said control processor, said control processor providing a stop clock interrupt signal to said CPU to enable said CPU to enter a first power saving mode when no input signal is received by said idle detector for a first predetermined time;

switching a logic state of said first control signal provided from said idle detector to said CPU if an input signal is received by said idle detector;

switching a logic state of said second control signal provided from said idle detector to said CPU if no input signal is received for a second predetermined time;

switching a logic state of said third control signal provided from said emergency condition detector to said CPU when an emergency condition occurs in the computer system; and switching a logic state of said stop clock interrupt signal as a result of said switching of the logic states of either said first, second or third control signals to thereby enable said CPU to change from said first power saving mode to a normal mode.

22. The method according to claim 21, wherein said computer system is switched into a second power saving mode after being changed to the normal mode from said first power saving mode, said second power saving mode being different than said first power saving mode.

* * * * *